United States Patent
Anand et al.

(10) Patent No.: US 6,684,327 B1
(45) Date of Patent: Jan. 27, 2004

(54) EXTENSIBLE, FLEXIBLE, MEMORY EFFICIENT TECHNIQUE FOR NETWORK BOOT WITHOUT SPECIAL DHCP/PXE HARDWARE

(75) Inventors: Vaijayanthimala K. Anand, Austin, TX (US); Steven Michael French, Austin, TX (US); James Richard Schoech, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 09/735,590

(22) Filed: Dec. 12, 2000

(51) Int. Cl.7 .............................................. G06F 9/445
(52) U.S. Cl. ......................................... 713/2; 709/222
(58) Field of Search .................. 713/1, 2; 709/220–222

(56) References Cited

U.S. PATENT DOCUMENTS

| | | | | |
|---|---|---|---|---|
| 5,842,011 A | * | 11/1998 | Basu | 713/2 |
| 5,974,547 A | * | 10/1999 | Klimenko | 713/2 |
| 6,317,826 B1 | * | 11/2001 | McCall et al. | 713/1 |
| 6,430,687 B1 | * | 8/2002 | Aguilar et al. | 713/2 |
| 6,463,530 B1 | * | 10/2002 | Sposato | 713/2 |

* cited by examiner

Primary Examiner—Thomas M. Heckler
(74) Attorney, Agent, or Firm—Duke W. Yee; Marilyn Smith Dawkins; Christopher P. O'Hagan

(57) ABSTRACT

A method, system, and program for network booting of a client computer is provided. The method comprises loading a special local bootstrap into a client computer and then using this special local bootstrap to save the client Interrupt Vector Table (IVT) to high memory and then passing control to a normal DOS bootstrap. From here a normal DOS boot is performed using files that contain pointers to the drivers of a network device which enables a specific network interface card. A special program is loaded which emulates a PXE application program interface and initiates a DHCP/PXE boot request to the network. In this manner, a client is able to perform a DHCP/PXE boot without specialized hardware, by relying on a software emulation of the necessary DHCP/PXE functions.

27 Claims, 3 Drawing Sheets

EXTENSIBLE, FLEXIBLE, MEMORY EFFICIENT TECHNIQUE FOR NETWORK BOOT WITHOUT SPECIAL DHCP/PXE HARDWARE

BACKGROUND OF THE INVENTION

1. Technical Field

The present invention relates to client computers that are bootable over a network and, in particular, allowing client computers to be serviced by multiple boot servers. More specifically, the present invention relates to network booting without specialized hardware.

2. Description of Related Art

With the advent of PC 98 specifications, many personal computer motherboards, network adapters, and boot diskettes include support for pre-boot extensions to download an operating system (OS) from the network. These systems rely on extensions to the bootstrap protocol (BOOTP) and dynamic host configuration protocol (DHCP) called the preboot execution environment (PXE) and require a DHCP/PXE server and a binary image negotiation layer (BINL) server.

BOOTP is a transmission control protocol/Internet protocol (TCP/IP) used by a diskless workstation or network computer (NC) to obtain its IP address and other network information, such as server address and default gateway. Upon startup, the client station sends out a BOOTP request to the BOOTP server, which returns the required information. The BOOTP request and response use an IP broadcast function that can send messages before a specific IP address is known.

DHCP is software that automatically assigns IP addresses to client stations logging onto a TCP/IP network. DHCP eliminates having to manually assign permanent IP addresses. PXE enables a client network computer that lacks a native operating system to locate and acquire a small network bootstrap program (NBP) from a server computer, referred to as a "boot server," through a network attachment. PXE also provides a means for running the NBP on the client to continue the network acquisition of additional software required to make the client capable of performing the more complex and useful tasks assigned to it by an enterprise.

PXE relies on extensions of DHCP as the means by which the client locates a boot server from which to acquire an NBP. A facilitating property of DHCP is that the client does not need the address of any other computer. The client performs a DHCP broadcast to discover any PXE proxy server that can recognize that the client is PXE-capable. The DHCP proxy server sends a DHCP offer to the client, which contains the address of the boot server from which the client may obtain the NBP. The client then obtains the NBP and all necessary software from the boot server via the trivial file transfer protocol (TFTP).

As servers (e.g. Windows 2000 and IBM Workspace On-Demand v.2) include server-side support for PXE client boot, a need arises to integrate existing PCs and network adapters into this environment, not just PCs with Intel motherboards. Although some firms have produced PXE boot diskettes, these diskettes are not extensible (supporting only a few related PCI Ethernet adapters) and are not flexible.

Therefore, it would be desirable to have a DHCP/PXE network boot mechanism that can handle any standard industry network adapter (even very old ones) by creating an Network Driver Interface Specification (NDIS) protocol driver that emulates DHCP/PXE but can bind to any NDIS protocol driver.

SUMMARY OF THE INVENTION

The present invention provides a method, system, and program for network booting of a client computer. The method comprises loading a special local bootstrap into a client computer and then using this special local bootstrap to save the client Interrupt Vector Table (IVT) to high memory and then passing control to a normal DOS bootstrap. From here a normal DOS boot is performed using files that contain pointers to the drivers of a network device which enables a specific network interface card. A special program is loaded which emulates a PXE application program interface and initiates a DHCP/PXE boot request to the network. In this manner, a client is able to perform a DHCP/PXE boot without specialized hardware, by relying on a software emulation of the necessary DHCP/PXE functions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
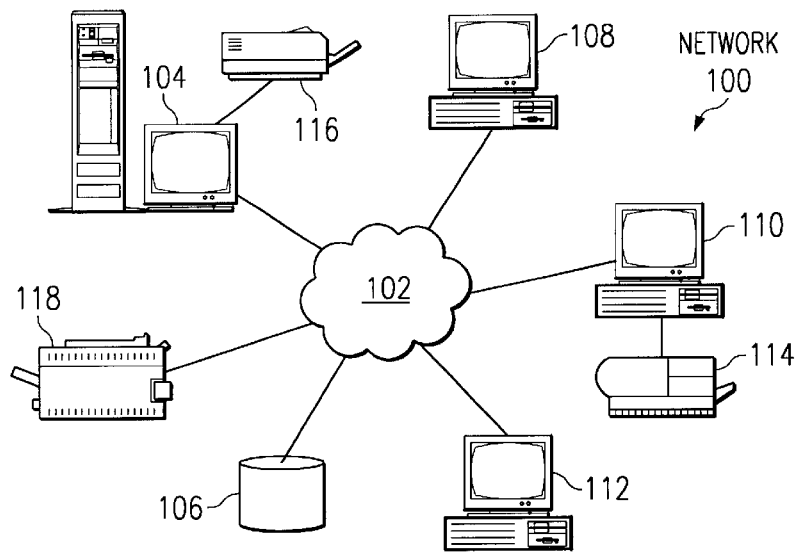
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

The present invention provides a network environment, which may include a DHCP/PXE proxy server, such as servers 104, 105, and multiple boot servers, which may be collocated on servers 104, 105 with the DHCP PXE proxy servers. A client computer, such as one of clients 108, 110, 112, includes pre-boot extensions to download operating system information from a boot server.

Figure 2:
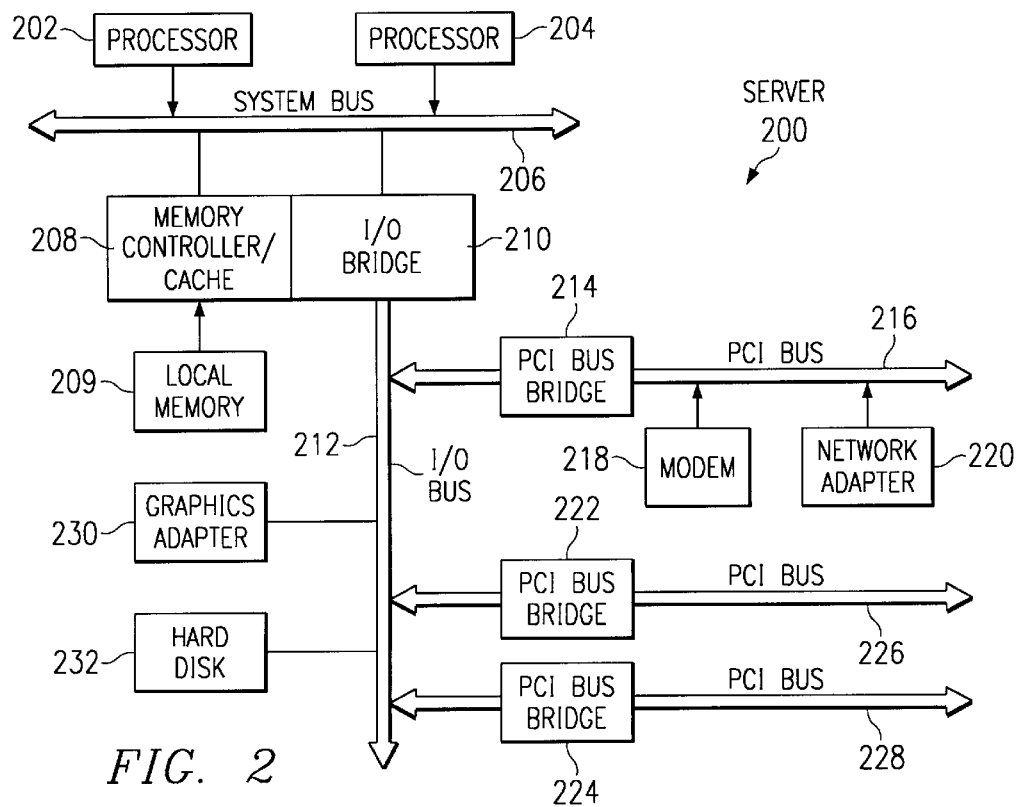
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
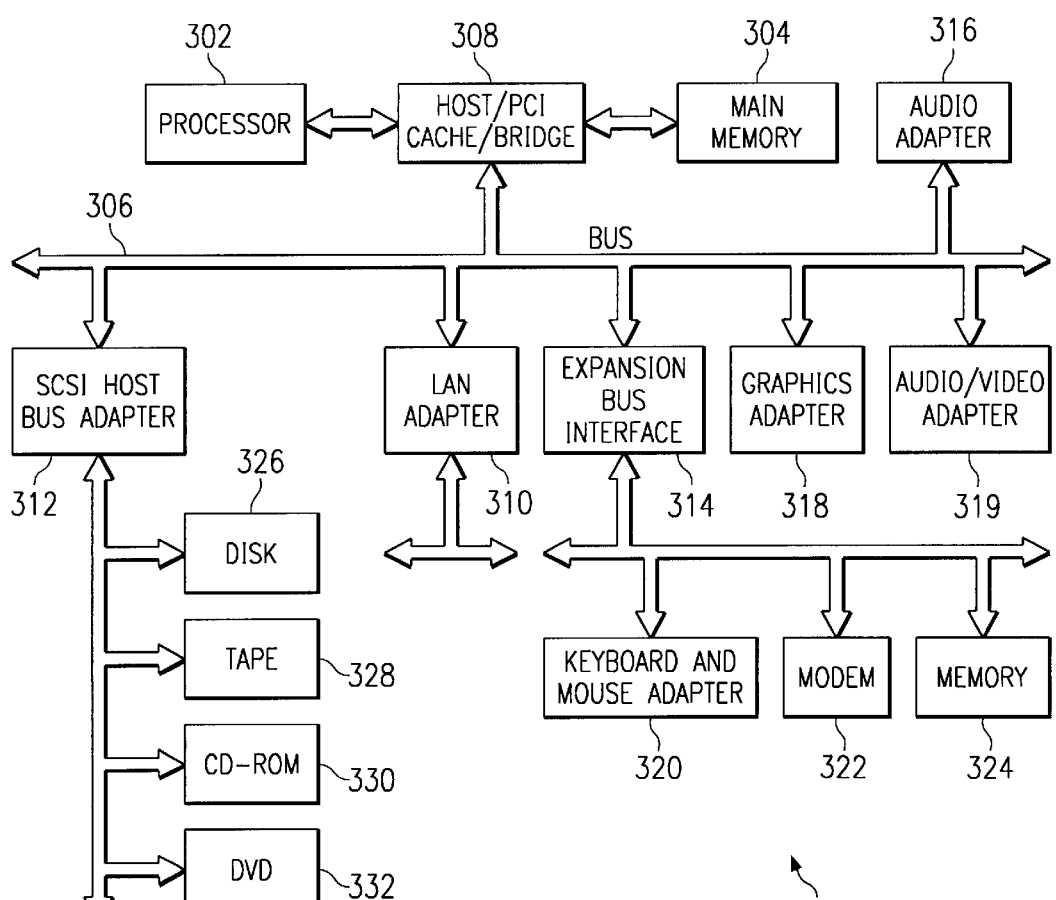
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer, including a telephony device, in addition to taking the form of a PDA. Data processing system 300 also may be a kiosk or a Web appliance.

The present invention provides the tools nededed to allow customers to create DHCP/PXE boot diskette, which would allow client machines to be booted from a network server that supports DHCP/PXE, even if the client communications adapter does not support the DCHP/PXE protocol. This eliminates having to upgrade communications hardware on the client machine.

The present invention consists of two parts. The first part is a utility that is run by an administrator to create diskettes used to boot the client workstation. The second part consists of the special code that makes up the diskette. This code handles the communication that would normally be handled by a communications adapter between a client and a server using DCHP/PXE protocol.

Figure 4:
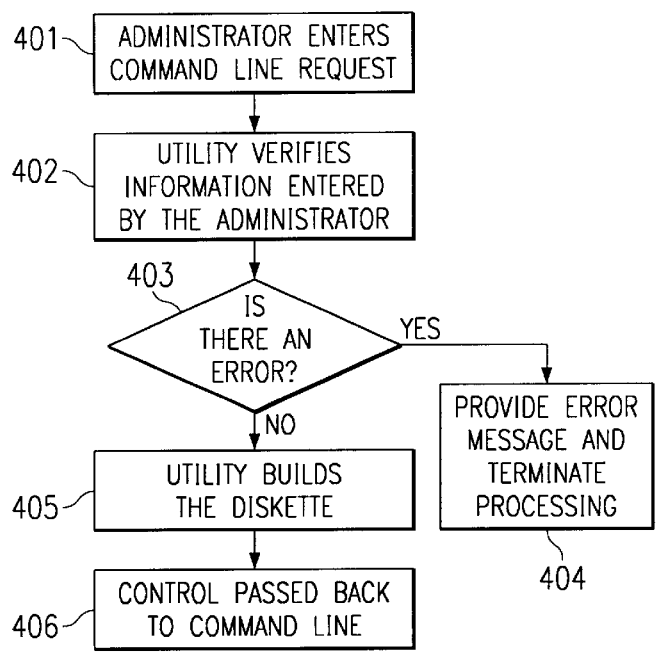
FIG. 4 depicts a flowchart illustrating a method for creating a boot diskette in accordance with the present invention.

Referring to FIG. 4, a flowchart illustrating a method for creating a boot diskette is depicted in accordance with the present invention. This process relies on a command line utility that allows the administrator to select the communications adapter that is being used by the client. The process begins when the administrator enter the command line request (step 401). The utility verifies the information provided by the administrator (step 402). If there is an error in the information entered by the administrator, an error code and message is provided, and processing is terminated (step 404).

If there is no error in the entered information, the utility pulls together all of the required information and builds the diskette (step 405). Control is passed back to the command line when processing is complete (step 406). The call level interface (CLI) for the command line utility is:

MKPXED [drive]/n: {nif_file} [/d: {driver_path}] [/c: {copyfile_path}] [/?]

MKPXED: This is the target diskette drive (OPTIONAL). The formal will be drive letter followed by a colon (an example is A:). If this is not provided the "A" drive will be used.

nif_file: This is the full pathname to the .nif file for the DOS NDIS adapter used by the client (REQUIRED unless/? is specified). This file is used to find the file name of the adapter driver, to build the protocol.ini file and to get the list of additional files used by the adapter driver. The format of this command is standard pathname representation.

driver_path: This is the full path to the directory where the adapter driver file is located (OPTIONAL). If not specified, the .nif file path is used. The format of this command is standard pathname representation.

copy_file: This is the full path to the directory where the additional files (Copyfile) is located (OPTIONAL). If not specified, the .nif file path is used. The format of this command is standard pathname representation.

/?: This parameter provides help information (OPTIONAL). If this is provided, all other parameters are ignored.

Though the above example relies on the bootstrap being recorded on a diskette, it should be pointed out that the bootstrap of the present invention can be installed in other computer readable media, such as, for example, a bootable CD or a boot partition.

Figure 5:
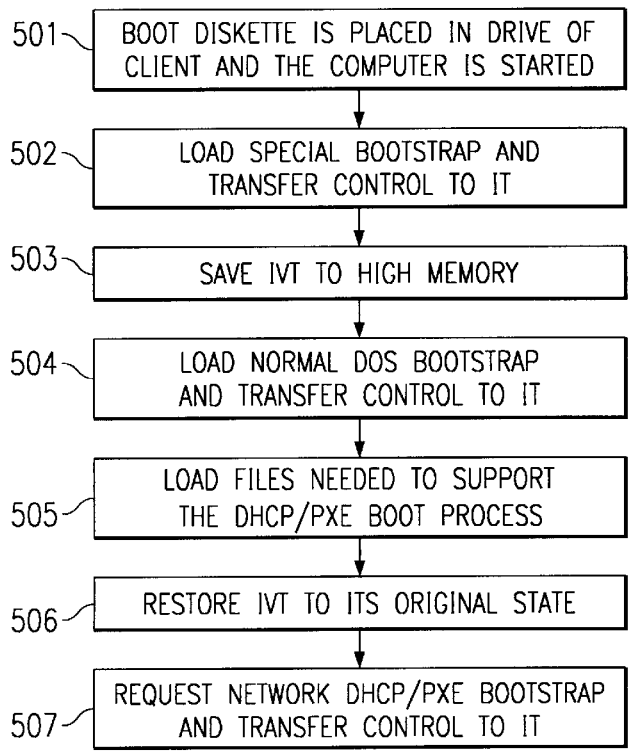
FIG. 5 depicts a flowchart illustrating a remote boot process controlled by the boot diskette in accordance with the present invention.

Referring now to FIG. 5, a flowchart illustrating a remote boot process controlled by the boot diskette is depicted in accordance with the present invention. The process begins by placing the boot diskette into the diskette drive of the client and starting the machine (step 501). The client must be set to boot from the diskette drive.

The boot diskette contains standard DOS and networking files, drivers for the communications adapter, and new files created specifically for the present invention.

One of the new files created for the present invention is a special bootstrap (BOOT.SYS) that replaces the DOS bootstrap that is normally installed by the SYS command or FORMAT with the /SYS option. When the client is booted, the BIOS will load this special bootstrap and transfer control to it (step 502). This special boostrap is needed in order to save the status of the Interrupt Vector Table (IVT) to high memory, so that the IVT can be restored at a later time (step 503). The IVT contains the pointers to routines in the BIOS, or elsewhere in memory, which are necessary to get the attention of the CPU, usually when I/O is required. By storing the IVT into high memory, the special bootstrap essentially places the system in a state of "suspended animation". In this way, when the operating system (OS) loads, the system can be placed back in the same state as when it started.

After the IVT is saved in high memory, the special bootstrap then loads the standard DOS bootstrap (BOOT2.SYS) and transfers control to it (step 504). A normal DOS boot then proceeds, using files (config.sys and Autoexec.bat) that contain pointers to the drivers of a network device. This network device is necessary to enable a specific network interface card which is used by the client to boot from the server using DHCP/PXE. A special program (DHCPBOOT.EXE) is responsible for loading all of the files needed to support the DHCP/PXE boot process and for providing the DOS emulation needed by these files (step 505). This program is necessary to support the unique memory model required by DHCP/PXE boot and to provide the DOS functions needed by the DOS NDIS MAC adapter driver. DHCPBOOT.EXE copies the IVT that was saved in high memory and restores the IVT to its original state (step 506). These special files interact through the standard NDIS layer.

A special device driver (PXEDHCP.DOS) contains the bulk of the new logic and functions that supply the PXE application program interface (API). This driver performs the DHCP and BINL negotiation with a server, requests the specified bootstrap program for the client from a specified server, and transfers control to the network DHCP/PXE bootstrap (step 507). The present invention provides a DHCP/PXE network boot mechanism that can handle any standard industry network adapter (even very old ones) by creating an NDIS protocol driver that emulates DHCP/PXE but can bind to any NDIS protocol driver.

When the boot is completed, the files needed by the client have been downloaded from the server. The diskette can then be removed from the diskette drive or left in so that it is available for future boots.

Extensions of the present invention would allow a single "diskette" (or boot partition) to include NDIS drivers for multiple network adapters and would also allow either user-selectable network adapter at boot or auto-discovery of the network adapter (picking the right NDIS driver on the fly) at boot time.

The present invention can work with different bootstraps and any network adapter that has an NDIS driver. By adding a PXE solution to a bootable hard drive, the present invention can add a network boot to boot menu, which adds ease of use for changing the start options. Users do not have to use firmware start options (which result in an extra system boot) and can use a boot manager (rather than hardware BIOS settings) to select network boot. Booting from a PXE partition is faster than booting from a diskette. In addition, allowing the use of the optimal, manufacturer written, NDIS network driver is an advantage, rather than forcing the monolithic and narrowly targeted PCI PXE ethernet driver, as found in previous approaches.

The present invention can be used with network frameworks which include DOS, Windows, Windows 2000, and NT platforms.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for network boot of a client computer, comprising:
    loading a special local bootstrap into a client computer;
    using the special local bootstrap to save the client Interrupt Vector Table to high memory and then pass control to a normal DOS bootstrap;
    performing a normal DOS boot using files that contain pointers to the drivers of a network device which enables a specific network interface card; and
    loading a special program that emulates a PXE application program interface and initiates a DHCP/PXE boot request to the network.

2. The method according to claim 1, wherein:
    the files that contain pointers to the network device drivers are constructed by a command line utility; and
    these files and the network device drivers are installed using a command line utility.

3. The method according to claim 1, wherein the command line utility allows a network administrator to select the communications adapter used by the client.

4. The method according to claim 1, wherein the special bootstrap is saved on a computer readable diskette.

5. The method according to claim 1, wherein the special bootstrap is saved in boot partition in the client.

6. The method according to claim 1, further comprising using a device driver to:
    supply a PXE application program interface for use by a network DHCP/PXE boot program;
    perform the DHCP and BINL negotiation with a corresponding network server;
    request a specified network bootstrap program for the client from a specified server; and
    transfer control to the network DHCP/PXE bootstrap.

7. The method according to claim 1, further comprising using a special program to:
    load all files needed to support the DHCP/PXE boot process;
    provide the DOS emulation needed by these files; and
    restore the Interrupt Vector Table that was saved in high memory by the special bootstrap.

8. The method according to claim 1, wherein the client uses a network adapter that has a NDIS driver.

9. The method according to claim 1, wherein the network framework includes DOS, Windows, Windows 2000, and NT platforms.

10. A computer program product for use in a data processing system, for network boot of a client computer, the computer program product comprising:
    instructions for loading a special local bootstrap into a client computer;
    instructions for using the special local bootstrap to save the client Interrupt Vector Table to high memory and then pass control to a normal DOS bootstrap;
    instructions for performing a normal DOS boot using files that contain pointers to the drivers of a network device which enables a specific network interface card; and
    instructions for loading a special program that emulates a PXE application program interface and initiates a DHCP/PXE boot request to the network.

11. The computer program product according to claim 10, wherein:
    the files that contain pointers to the network device drivers are constructed by a command line utility; and
    these files and the network device drivers are installed using a command line utility.

12. The computer program product according to claim 10, wherein the command line utility allows a network administrator to select the communications adapter used by the client.

13. The computer program product according to claim 10, wherein the special bootstrap is saved on a computer readable diskette.

14. The computer program product according to claim 10, wherein the special bootstrap is saved in boot partition in the client.

15. The computer program product according to claim 10, further comprising a device driver which:
    supplies a PXE application program interface for use by a network DHCP/PXE boot program;
    performs the DHCP and BINL negotiation with a corresponding network server;
    requests a specified network bootstrap program for the client from a specified server; and
    transfers control to the network DHCP/PXE bootstrap.

16. The computer program product according to claim 10, further comprising special instructions to:
    load all files needed to support the DHCP/PXE boot process;
    provide the DOS emulation needed by these files; and
    restore the Interrupt Vector Table that was saved in high memory by the special bootstrap.

17. The computer program product according to claim 10, wherein the client uses a network adapter that has a NDIS driver.

18. The computer program product according to claim 10, wherein the network framework includes DOS, Windows, Windows 2000, and NT platforms.

19. A system having means for network boot of a client computer, comprising:
    means for loading a special local bootstrap into a client computer;

means for using the special local bootstrap to save the client Interrupt Vector Table to high memory and then pass control to a normal DOS bootstrap;

means for performing a normal DOS boot using files that contain pointers to the drivers of a network device which enables a specific network interface card; and means for loading a special program that emulates a PXE application program interface and initiates a DHCP/PXE boot request to the network.

20. The system according to claim 19, wherein:

the files that contain pointers to the network device drivers are constructed by a command line utility; and these files and the network device drivers are installed using a command line utility.

21. The system according to claim 19, wherein the command line utility allows a network administrator to select the communications adapter used by the client.

22. The system according to claim 19, wherein the special bootstrap is saved on a computer readable diskette.

23. The system according to claim 19, wherein the special bootstrap is saved in boot partition in the client.

24. The system according to claim 19, further comprising means for using a device driver to:

supply a PXE application program interface for use by a network DHCP/PXE boot program;

perform the DHCP and BINL negotiation with a corresponding network server;

request a specified network bootstrap program for the client from a specified server; and transfer control to the network DHCP/PXE bootstrap.

25. The system according to claim 19, further comprising means for using a special program to:

load all files needed to support the DHCP/PXE boot process;

provide the DOS emulation needed by these files; and restore the Interrupt Vector Table that was saved in high memory by the special bootstrap.

26. The system according to claim 19, wherein the client uses a network adapter that has a NDIS driver.

27. The system according to claim 19, wherein the network framework contains DOS, Windows, Windows 2000, and NT platforms.

* * * * *